(12) United States Patent
Stahl et al.

(10) Patent No.: US 7,006,971 B1
(45) Date of Patent: Feb. 28, 2006

(54) RECOGNITION OF A SPEECH UTTERANCE AVAILABLE IN SPELLED FORM

(75) Inventors: Volker Stahl, Aachen (DE); Alexander Fischer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 851 days.

(21) Appl. No.: 09/663,585

(22) Filed: Sep. 18, 2000

(30) Foreign Application Priority Data

Sep. 17, 1999  (DE) .............................. 199 44 608

(51) Int. Cl.
*G10L 15/12* (2006.01)
(52) U.S. Cl. ...................................... 704/242; 704/252
(58) Field of Classification Search ................ 704/242, 704/241, 251, 252, 254, 257
See application file for complete search history.

(56) References Cited

U.S. PATENT DOCUMENTS

| | | | | |
|---|---|---|---|---|
| 4,907,278 A | * | 3/1990 | Cecinati et al. ............. | 704/246 |
| 5,067,166 A | * | 11/1991 | Ito .............................. | 382/215 |
| 5,177,685 A | * | 1/1993 | Davis et al. ............. | 455/456.5 |
| 5,349,645 A | * | 9/1994 | Zhao .......................... | 704/243 |
| 5,392,363 A | * | 2/1995 | Fujisaki et al. ............. | 382/187 |
| 5,621,859 A | * | 4/1997 | Schwartz et al. ........... | 704/256 |
| 5,634,083 A | * | 5/1997 | Oerder ........................ | 704/253 |
| 5,778,405 A | * | 7/1998 | Ogawa ........................ | 715/532 |
| 5,799,065 A | | 8/1998 | Junqua et al. ................ | 379/88 |
| 5,940,793 A | * | 8/1999 | Attwater et al. ............ | 704/231 |

OTHER PUBLICATIONS

Kenny, Hollan, Gupta, Lennig, Mermelstein, and O'Shaughnessy, "A*-Admissible Heuristics for Rapid Lexical Access," IEEE Trans. Speech and Audio Proc., vol. 1, iss. 1, Jan. 1993, pp. 49-58.*
E.G. Schukat-Talamazzini, "Automatische Spracherkennung". pps 245-247.

* cited by examiner

*Primary Examiner*—Richemond Dorvil
*Assistant Examiner*—Donald L. Storm

(57) ABSTRACT

This invention relates to a method of recognizing a speech utterance ($\underline{s}$) available in spelled form, comprising a processing stage in which a corresponding letter sequence ($\underline{r}$) is estimated by means of a letter speech recognition unit (2) based on Hidden Markov Models, and a second processing stage (3) in which the estimated result ($\underline{r}$) produced by the first processing stage utilizing a statistical letter sequence model (4) and a statistical model (5) for the speech recognition unit (2) is post-processed, while the dynamic programming method is used during the post-processing. For providing robust and efficient speech recognition procedures for the use of speech signals for system control, a grid structure on which the dynamic programming is based and whose node points are provided for the assignment to accumulated probability values, is converted into a tree structure and that an A* algorithm is used for finding an optimum tree path. Also a speech control device wherein a complete word is input as a control signal and at least part of this word in spelled form is input, while the result of the letter speech recognition is used within the scope of the word speech recognition.

5 Claims, 2 Drawing Sheets

RECOGNITION OF A SPEECH UTTERANCE AVAILABLE IN SPELLED FORM

Figure 1:
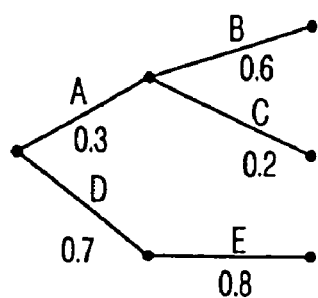

The invention relates to a method of recognizing a speech utterance available in spelled form, comprising a first processing stage in which a corresponding letter sequence is estimated by means of a letter speech recognition unit based on Hidden Markov Models, and including a second processing stage in which the estimated result delivered by the first processing stage which utilizes a statistical letter sequence model derived from the vocabulary and a statistical model for the speech recognition unit is post-processed, while the dynamic programming method is used during the post-processing.

Such a method is known, for example, from U.S. Pat. No. 5,799,065 within the scope of the automatic setting up of telephone connections by speech inputs. A caller then inputs in continuously spelled form the name of the desired other subscriber to be called after a respective request. The input is further processed in a speech recognition unit utilizing a HMM (Hidden Markov Model) in which also an n-gram letter grammar is used. N best word hypotheses are determined which are further processed in accordance with the Dynamic Programming method (DP) in which the determined hypotheses are compared to the contents of a name lexicon. The N best word hypotheses delivered by the DP unit are used as a dynamic grammar which is used by a further speech recognition unit that selects from the word hypotheses delivered by the DP unit one word hypothesis as a recognition result corresponding to the name that has been input.

In car navigation systems it is also known to utilize inputs by speech utterances. In this way, for example place names are input as destinations. To improve the reliability of the speech recognition, not only a word speech recognition is provided with an input of naturally pronounced words, but also a letter speech recognition which serves to recognize spelled speech inputs.

It is an object of the invention to provide robust and efficient speech recognition procedures for the use of speech signals for system control while letter speech recognition is used.

The object is achieved in that the grid structure on which the dynamic programming is based, whose nodes are provided for assignment to accumulated probability values, is converted into a tree structure and in that the A* algorithm is used in the search for an optimum tree path. This estimate leads to a more rapid letter speech recognition with a reduced need for memory space.

In an embodiment there is provided that sub-optimum tree paths are determined in accordance with the N best estimates for the speech utterance, with N>1. As a result, recognition alternatives are available for a further processing, so that an error during the finding of the optimum tree path can more easily be corrected in succeeding processing steps when sub-optimum recognition results are made use of.

A further saving of computation time is achieved in that, when an optimum tree path is searched for, the tree paths which already at the beginning of the search have a small probability compared to other tree paths are no longer followed.

Furthermore, it is proposed that the first processing stage is carried out by means of a first IC and the second processing stage is carried out by means of a second IC. The first IC (Integrated Circuit) is preferably a digital signal processor specially programmed for speech recognition procedures. The second IC may specifically be a controller module, which is also used for realizing other system functions.

The invention also relates to a method of system control by means of speech signals in which
- a whole word serving as a control signal is input and at least part of this word is input in spelled form,
- word speech recognition is used for recognizing the whole word that is input,
- letter speech recognition as described above is used for recognizing the spelled part that is input of the whole word, and
- a vocabulary assigned to the word speech recognition is restricted by the recognition result of the letter speech recognition.

Such a method leads to a reliable speech control also for difficult general conditions such as, for example, a high noise level in motorcars or indistinct speech of a user.

The invention also relates to a speech-controlled electric device, more particularly, a navigation system for motorcars, comprising components for implementing one of the methods described above.

Figure 2:
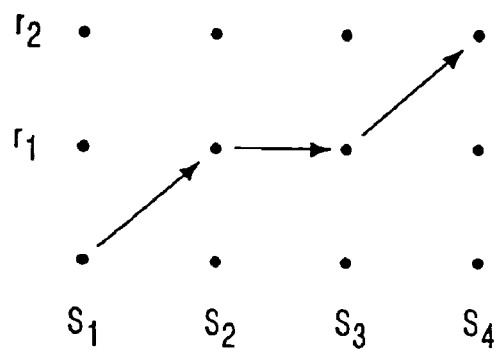
Figure 3:
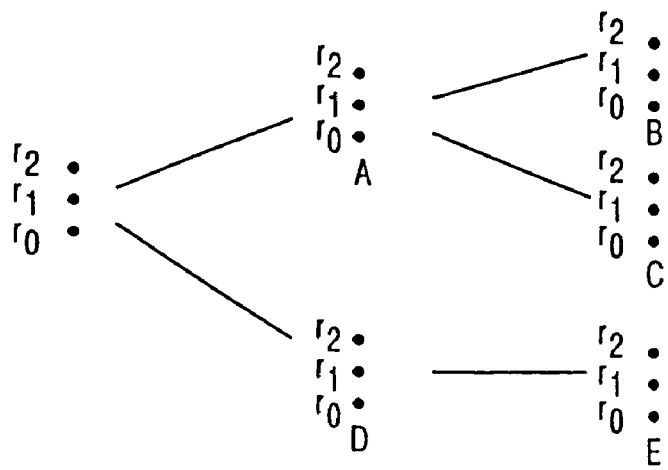
Figure 4:
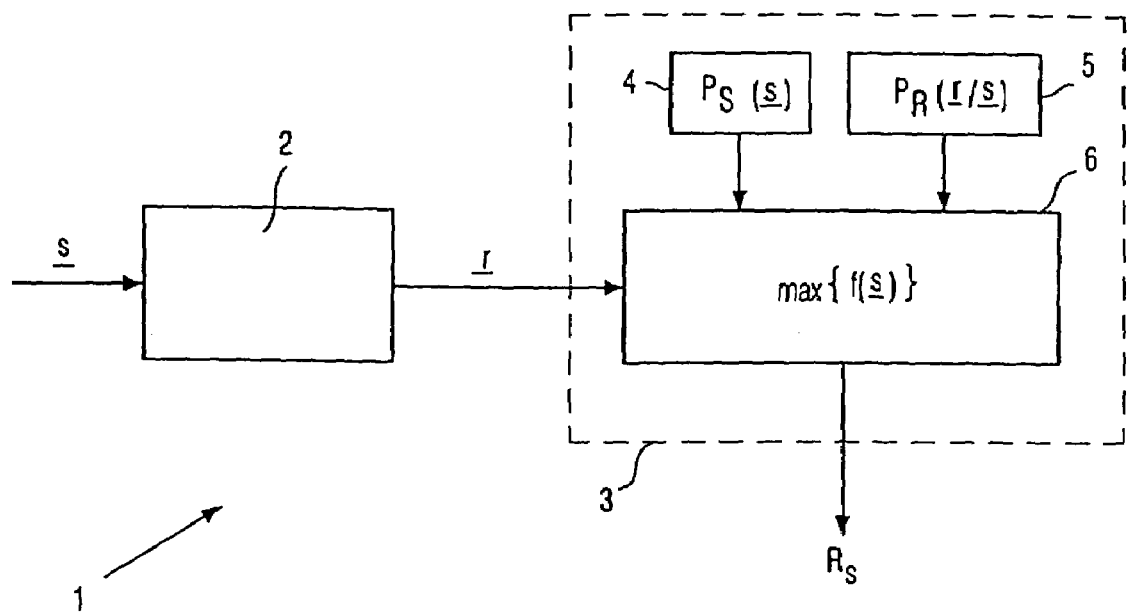
Figure 5:
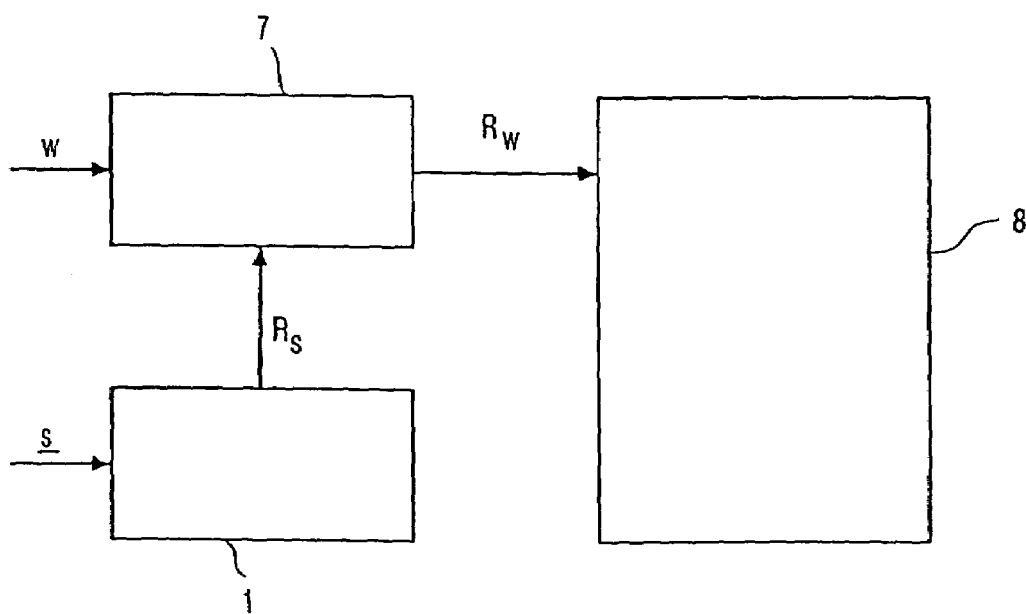

Examples of embodiment of the invention will be further explained hereinafter, inter alia, with reference to the drawings, in which:

FIG. 1 shows a tree structure in explanation of the statistical model of a letter sequence, FIG. 2 shows an example of a grid path, FIG. 3 shows a tree structure whose tree nodes correspond to columns of a DP grid, FIG. 4 shows a block diagram of a system for recognizing spelled speech utterances, and FIG. 5 shows a block diagram of a system with speech control by inputting words and spelled speech utterances.

A preferred application of the invention is a navigation system for motorcars with speech control. The automotive speech recognition for the speech control is difficult here, because the vocabulary to be recognized (for example, several tens of thousands of names of towns) is extensive and the acoustic conditions in motorcars are to be considered unfavorable owing to many disturbing noises that show up. Furthermore, it may be assumed that the available hardware in navigation systems, taking the complexity of speech recognition procedures into consideration, has only very limited processing capacity and a relatively small main memory. However, the invention is not restricted to the application to navigation systems for motorcars, but to all speech control apparatus and similar marginal conditions.

In the navigation system under consideration here, a user is requested to input speech in the speech recognition mode, for example, a name of a town by uttering a whole word and, in addition, by (continuously) spelling at least part of the word that is input. In two first processing stages both a word speech recognition based on the predefined vocabulary and a letter speech recognition are carried out. With the letter speech recognition, the number of letters per word to be input is not predefined to the user. With the result of the speech recognition as regards the letters that are input, the words of the predefined vocabulary can be determined which are taken as a possibility of a word speech recognition result. Based on the limited vocabulary resulting herefrom, a word speech recognition for the word that is input is carried out again in a further processing stage.

Hereinafter will be further explained the letter speech recognition. In this speech recognition, high error rates are regularly to be reckoned with, especially in environments that have considerable noise such as the inside of motorcars.

An improvement of this error rate by taking the vocabulary into consideration when the letter speech recognizer performs its acoustic search encounters the problem that customary speech recognition ICs do not contain sufficient memories for storing the amounts of data resulting from a large vocabulary. For this reason, the letter speech recognition is carried out in two independently operating processing stages in the present navigation system. In the first processing stage the letters that are input are recognized by a customary letter recognizer without taking a vocabulary into consideration. This processing stage is carried out by means of a speech recognizer IC specially designed and programmed for this purpose. In the second processing stage is carried out a post-processing. This post-processing is carried out by means of the controller which is used for converting the other system functions (that is, the special navigation functions here), and which can access sufficient storage space.

For the post-processing is available additional information concerning various possible letter sequences, more particularly—as in the present example of embodiment—a list of reliable letter sequences, that is, letter sequences by which each time at least one word of the vocabulary begins, and statistical information relating to such letter sequences, for example, certain probabilities (such as, for example, the probability that if the third letter of a word is C the two other letters are an A). As further statistical information that reduces the error rate is regarded the probability of mixing up two letters (N and M are, for example, similar to each other and therefore have a high confusion probability) or probabilities with respect to an invertent insertion or omission of a letter.

The problem underlying the post-processing can be formulated as follows:

Given are:
 a statistical model of the letter speech recognizer (that is, probabilities of recognition errors);
 a statistical model of the uttered letter sequence, and
 a sequence of recognized letters.

Searched for is:
The letter sequence having the largest probability of being the uttered letter sequence.

In the following, $\Sigma$ is referred to as a symbol for a letter sequence.

An uttered letter sequence $\underline{s}$ (and input in the speech recognizer) having length n (with letters $s_i$) and a recognized letter sequence $\underline{r}$ of length m (with letters $r_i$) is described by $$\underline{s}=(s_1, s_2, \ldots, s_n) \text{ with } s_i \in \Sigma$$

$$\underline{r}=(r_1, r_2, \ldots, r_m) \text{ with } r_i \in \Sigma$$

The letter sequences are underlined to distinguish them from individual letters. Individual lengths n and m can follow from the fact that the speech recognizer used erroneously inserts letters in the recognition result or also erroneously leaves out letters.

Now the letter sequence $\underline{s}$ is searched for with which with the given letter sequence $\underline{r}$ the probability $$P(\underline{s}\mid\underline{r}) = \frac{P(\underline{r}\mid\underline{s})P(\underline{s})}{P(\underline{r})}$$

is maximum. Since the probability maximum of $P(\underline{r})$ is independent, the letter sequence $\underline{s}$ that maximizes the expression $$P(\underline{r}\mid\underline{s})P(\underline{s})$$

is to be searched for. The probability term $P(\underline{r}\mid\underline{s})$ describes the speech recognizer properties (by the probability of a sequence of recognized letters $\underline{r}$ with a given sequence of uttered letters $\underline{s}$) on the other hand, the probability term $P(\underline{s})$ describes the probabilities of occurrence of uttered letter sequences $\underline{s}$ (in accordance with a speech model which takes into consideration that not all the letter combinations are equally probable).

For the computation of the maximum of the expression $P(\underline{r}\mid\underline{s}) P(\underline{s})$, an efficient algorithm is to be given. For this purpose, simplified assumptions with respect to the two probability functions $P(\underline{r}\mid\underline{s})$ and $P(\underline{s})$ are made to thus obtain suitable statistical models for the speech recognizer and the uttered letter sequence. In the following the statistical model for $P(\underline{r}\mid\underline{s})$ is referenced $P_R(\underline{s})$ and the statistical model for $P\underline{s}$ is referenced $P_S(\underline{s})$.

As a statistical model for the uttered letter sequence (which model is derived from the predefined vocabulary) is now used the expression $$P_S(s_{i+1}\mid s_1, \ldots, s_i)$$

which indicates the probability that a sequence of i uttered letters $s_1, \ldots, s_i$ has $s_{i+1}$ as the next uttered letter. The probability that the utterance ends after the letters $s_1, \ldots, s_i$ is given by $$P_s(\$ \mid s_1, \ldots, s_1) = 1 - \sum_{s_{i+1}\in\Sigma} P_s(s_{i+1}\mid s_1, \ldots, s_1),$$

where $ denotes the end of a letter sequence. Such probabilities can easily be estimated from a given vocabulary and a priori probabilities for the words of the vocabulary. Accordingly, the probability of a sequence of uttered letters $\underline{s}=s_1, s_2, \ldots, s_n)$ can be expressed by $P_S(\underline{s})=P_S(s_1\mid\#)P_S(s_2\mid s_1) \ldots P_S(s_n\mid s_1, \ldots, s_{n-1})P_S(\$\mid s_1, \ldots, s_n)$, where the sign # denotes the beginning of a letter sequence. Furthermore, a limited vocabulary V is assumed to be $$V=\{\underline{s}\mid P_S(\underline{s})\neq 0\}$$

For the case where a letter sequence $\underline{s}$ is an element of the vocabulary V, also any prefix of $\underline{s}$ (that is, a sequence of one or more successive letters by which the letter sequence $\underline{s}$ starts) is an element of the vocabulary V. Consequently, the user can utter an arbitrarily long initial letter chain of the word to be spelled and need not spell the whole word. By appropriately selecting $P_S$, a priori knowledge can be used about the probability of how many letters a user is expected to utter when inputting in the spelling mode.

The various probabilities $P_S$ of a vocabulary V can be represented by a tree structure in a simple manner. One side of the tree is then assigned a letter and its associated probability value. Each uttered letter sequence then corresponds to a tree node while the probability of the letter sequence ensues from the product of the probabilities that are assigned to the side of the tree that leads from the tree root to the respective tree node.

An example of such a tree structure is shown in FIG. 1. For forming the vocabulary in a simplified manner, A, B, C, D and E are assumed to be possible letters which, together with the associated probability of occurrence, are assigned to one side of a tree. Accordingly, for the letter sequences AB, AC and DE there are the probability values $P_S(AB)=0.18$, $P_S(AC)=0.06$ and $P_S(DE)=0.56$ as a product of the probability values respectively assigned to the individual letters of the letter sequences. Under the condition that the probability is used of reaching an end $ of a letter sequence already before a complete tree path with $P_S(\$)=0.2$ has been run through, the probability values $P_S(A)=0.06$ and $P_S(D)=0.14$ are found from a multiplication of $P_S(\$)$ by the probabilities assigned to the letters A and D or the associated sides of the tree, respectively. The sum of the probability values $P_S$ is one.

To obtain a simple and statistical model for the letter speech recognizer (or rather: for the recognition errors of the letter speech recognizer) it is assumed that the uttered letters are uncorrelated and only the correlations between a recognized and an uttered letter are taken into consideration. The statistical model for the letter speech recognizer provides the probability that a letter r was recognized and a letter s was uttered (with r, s ∈ Σ). Furthermore, in this model are used probabilities of insertions of letters r without a corresponding uttered letter s and probabilities of deleting letters (no recognized letter r for the case of an uttered letter s). To describe these cases, a virtual letter $\varepsilon \notin \Sigma$ is introduced which is used for denoting both a letter that is not uttered and for denoting a letter that is not recognized. Accordingly, there is for the statistical model of the letter recognizer:

$P_R(r, s)$ with r, s ∈ Σ ∪ {ε}.

These combined probabilities are considered elements of a matrix ("confusion matrix") in which the letters r and s denote the individual rows or columns respectively, of the matrix. Starting from this matrix present in stored form and assumed to be a given fact, certain probabilities $P(r|s)$ are computed for a recognized letter sequence $r$ and an uttered letter sequence $s$, which will be further explained hereinafter.

To represent possible delays in assignments of letter sequences $r$ and $s$, a two-dimensional grid is used which has m+1 points in vertical direction and n+1 points in horizontal direction, which are referenced $r_i$ and $s_i$ respectively. The $0^{th}$ row and the $0^{th}$ column remain unreferenced. The time delay of the assignment of a specific letter sequence $r$ to a certain letter sequence $s$ corresponds to a path through such a grid, the path through a sequence π of co-ordinate pairs $\pi=(\sigma_1, \rho_1), (\sigma_2, \rho_2), \ldots, (\sigma_k, \rho_k)$ with $\sigma_1=\rho_1=0$;

$(\sigma_{i+1}, \rho_{i+1}) \in \{(\sigma_i, \rho_i+1), (\sigma_i+1, \rho_{i+1})(\sigma_i+1, \rho_i+1)\}$;

$\sigma_i \leq n$, $\rho_i \leq m$.

A path segment $(\sigma_{i-1}, \rho_{i-1}) \to (\sigma_i, \rho_i)$, in which both the σ co-ordinate and the p co-ordinate have been incremented, implies that a letter $s_{\sigma i}$ has been uttered and a letter $r_{\rho i}$ has been recognized. If, however, in a path segment the a co-ordinate is constant, a letter $r_{\rho i}$ was recognized indeed, but no letter was uttered, which corresponds to the erroneous insertion of a letter by the letter speech recognizer. If the ρ co-ordinate is constant, a letter $s_{\sigma i}$ would have been uttered, it is true, but a speech recognizer would have recognized any corresponding letter (erase error).

FIG. 2 shows by way of example a section of such a grid structure with a drawn-in path π. Three letters $s_1$, $s_2$ and $s_3$ were uttered and two letters $r_1$ and $r_2$ were recognized. The letter $r_1$ was recognized as letter $s_1$. The letter $s_2$ was not recognized (i.e. deleted). The letter $s_3$, was finally recognized as letter $r_2$.

Generally, there is the probability $P_R$ of an uttered letter sequence $s$, a recognized letter sequence $r$ and a grid path π in accordance with $$P_R(r|s) = \sum_{\pi} \prod_{i=1}^{|\pi|} \begin{cases} P_R(r_{\rho_i}|s_{\sigma_i}) & \text{if } \rho_i \neq \rho_{i-1} \text{ and } \sigma_i \neq \sigma_{i-1} \\ P_R(\varepsilon|s_{\sigma_i}) & \text{if } \rho_i = \rho_{i-1} \text{ and } \sigma_i \neq \sigma_{i-1} \\ P_R(r_{\rho_i}, \varepsilon) & \text{if } \rho_i \neq \rho_{i-1} \text{ and } \sigma_i = \sigma_{i-1} \end{cases}$$

In the third row, for the case where a letter was recognized indeed but no corresponding uttered letter was available, a compound probability in lieu of a certain probability (like in the two upper lines) was used for $P_R$.

Summarizing may be stated that the problem lying at the base of the letter speech recognition is such that the uttered letter sequence $s \in V$ is to be determined that maximizes the function $f(s)$ for a given recognized letter sequence $r$ with $f(s)=P_R(r|s)P_S(s)$ An improvement of the letter speech recognition appears when a letter speech recognizer is used that does not issue only individual letters as hypotheses for a respective uttered letter, but a list N of the best letter hypotheses (N>1), which are weighted with a probability value. This extended result information may be processed completely in analogy with the above embodiments (thus processing also based on a matrix and a grid structure), which leads to an improved recognition error rate.

In the following the post-processing will be described by which the problem of maximizing $f(s)$ mentioned above is solved.

In the following Σ is a predefined alphabet, $V \subseteq \Sigma^*$ a limited vocabulary with Σ* as a quantity of possible letter chains, so that in the case of an uttered letter sequence $s \in V$, also each prefix of the letter sequence $s$ is an element of V. $P_R$, $P_S$ and $f(s)$ must be as defined above. Furthermore, $r \in \Sigma^*$ is a random, but fixed, sequence of recognized letters.

A (direct) possibility of determining the sequence $s$ that has the largest probability is calculating all the values $f(s)$ for all $s \in V$, where the sequence $s$ searched for is the sequence for which $f(s)$ is maximum. For evaluating $f(s)$, there is a slightly modified version of the method of Dynamic Programming (DP algorithm).

When the method of dynamic programming is implemented, first a grid with (n+1)×(m+1) points is used, where in the present example of embodiment n is the number of uttered letters and m the number of recognized letters. The rows of the grid are featured by uttered letters and the columns of the grid by recognized letters. As already shown in the grid of FIG. 2, the first row and the first column of the grid are not featured. Each grid point featured by a pair of co-ordinates (i,j), with i=0, ..., n and j=0, ..., m is assigned a probability $p_{ij}$ which expresses the probability that the letter sequence $s_1, \ldots, s_i$ is a sequence of uttered letters (here especially a prefix of a word that has been input, that is, a sequence of at least one letter by which the word starts) and that $r_1, \ldots, r_j$ is a respective associated sequence of recognized letters. The DP algorithm is a method of computing the probabilities $p_{ij}$ column by column. According to this method the $0^{th}$ column in each row is initialized with a 1. The column i+1 is determined for i=0, ..., n−1 from the column i in accordance with:

$$p_{i+1,0}=p_{i,0}\ P_R(\epsilon|s_{i+1})P_S(s_{i+1}|s_1, \ldots, s_i)\ \text{and}$$

$$p_{i+1,j+1}=p_{i+1,j}P_R(r_{j+1}, \epsilon)$$

$$+p_{i,j}\ P_R(r_{j+1}|s_{i+1})P_S(s_{i+1}|s_1, \ldots, s_i)$$

$$+p_{i,j+1}\ P_R(\epsilon|s_{i+1})P_S(s_{i+1}|s_1, \ldots, s_i)$$

for j=0, ..., m−1.

When compared to the formula written above (and in which a product is formed and a sum is formed) the searched function $f(\underline{s})$ for $P_R(\underline{r}|\underline{s})$ is in accordance with $$f(\underline{s})=p_{n,m}P_S(\$|\underline{s}).$$

If two letter sequences $\underline{s}_1$ and $\underline{s}_2$ start with the same letter sequence $\underline{s}$ of length n, the first n columns of the grid used as a basis for the DP algorithm are identical. To avoid consequent redundant calculations, the following modification is proposed: the columns of the DP grid (of a grid used as a basis for the DP algorithm) are defined as nodes of a tree. Each tree path now corresponds to a DP grid and tree paths having an identical initial segment correspond to two DP grids for the letter sequences $\underline{s}_1$ and $\underline{s}_2$ with the same initial letter sequence (worded differently: the same prefix). FIG. 3 clarifies this approach and shows the tree structure corresponding to the example shown in FIG. 1. In the example shown, two letters were recognized, so that each tree node is assigned three DP grid nodes (corresponding to one DP grid column).

In the following will be described an approach that shows that not all the nodes of such a tree structure need to be evaluated to obtain the maximum of the function $f(\underline{s})$ even when the so-called A* algorithm is used.

The tree nodes will be referenced $t^{(1)}, t^{(2)}, \ldots$ hereinafter. The $j^{th}$ entry (j=0, ..., m) in the grid column which is assigned to the node $t^{(k)}$ is $t_j^{(k)}$. Furthermore, $$t_\$^{(k)}=t_m^{(k)}P_S(\$|\underline{s}),$$

where the letter sequence $\underline{s}$ is the letter sequence lying on the path to the node $t^{(k)}$. Now the problem of finding the sequence of uttered letters with the largest probability can be formulated in a modified form as a search for the tree node $t^{(k)}$ for which the value $t_\$^{(k)}$ is maximum.

After a tree node $t^{(k)}$ has been evaluated, an upper limit value $\bar{t}^{(k)}$ is estimated by $$\bar{t}^{(k)} \geq \max\ \{t_\$^{(1)}|t^{(1)}\text{ is the successive node of }t^{(k)}\}.$$

After two tree nodes $t^{(k)}$ and $t^{(k')}$ have been evaluated and when there is the condition $$\bar{t}^{(k)} \leq t_\$^{(k')}$$

one already knows that no successive tree node of the tree node $t^{(k)}$ can be an optimum tree node. An evaluation of such successive tree nodes is thus superfluous and is not carried out.

For calculating the limit value $\bar{t}^{(k)}$, the so-called A* algorithm is used.

The iteration steps of the A* algorithm known per se and essential here (see, for example, E. G. Schukat-Talamazzini, "Automatische Spracherkennung", Vieweg-Verlag, 1995, chapter 8.2.1) are:

(1) Initialization:
Evaluation of the tree root node.
(2) Iteration:
E is a set of nodes already evaluated.
It holds that: $p=\max\ \{t_\$|t \in E\}$.
It holds that: $\bar{p}=\max\ \{\bar{t}|t \in E\}$.
(3) Verification whether the termination criterion is fulfilled:
For $p \geq \bar{p}$: End of the algorithm (no further iteration steps necessary).
The optimum tree node is the node $t \in E$, for which $t_\$$ is maximum.
(4) Expansions of the tree:
A tree node $t \in E$ not expanded thus far is selected and expanded, which implies an evaluation of all its daughter nodes. Subsequently, the algorithm is continued with step (2).

It should be noted that in step (4) there is basically freedom of selection of a node $t \in E$. To guarantee maximum efficiency of the algorithm, it is to be strived for, however, to select the tree node at the point that has the largest probability of being part of the path to the optimum tree node. Accordingly, the tree node $t \in E$ is selected here for which the maximum $\max_j\ \{t_j\}$ is maximum, that is, the tree node $t \in E$ is selected that has the most probable already evaluated grid point.

Now it will be further discussed how the value for $\bar{t}^{(k)}$ can be determined. Basically, there are many possibilities to determine this value. An advantageous possibility of determining $\bar{t}^{(k)}$—for which the cost of computation is kept low and redundant iteration steps are avoided—is proposed to be the following:

Let $$\hat{j} = \underset{j=0,\ldots,m}{\mathrm{argmax}}\{t_j^{(k)}\}$$

and $$c_j=\max\{P_R(r_j|s)|s\in\Sigma\}$$

for $j=\hat{j}+1, \ldots, m$. The sought value of $\bar{t}^{(k)}$ will then be:

$$\bar{t}^{(k)} = \max\begin{cases} t_m^{(k)}, \\ t_{m-1}^{(k)}c_m, \\ t_{m-2}^{(k)}c_m c_{m-1}, \\ \vdots \\ t_{\hat{j}}^{(k)}c_m c_{m-1} \cdots c_{\hat{j}+1} \end{cases}.$$

The computation of this expression for $\bar{t}^{(k)}$ is linked with little additional cost of computation, because the products $c_m, c_m c_{m-1}, \ldots$ may be computed in advance and the minimum index $\hat{j}$ is determined in step (4) of the A* algorithm anyway.

A further variant of embodiment evolves when the A* algorithm is not stopped when the condition in step (3) is satisfied for the first time, but when further algorithm loops are passed through and further sub-optimum tree paths are determined. In that case, a list of N best hypotheses is issued in accordance with N−1 further loops passed through instead of a single hypothesis for the sequence of uttered letters, that is, those hypotheses that the most probably reproduce the sequence of the uttered letters.

The algorithm described above guarantees the finding of the optimum tree node and thus the optimum estimate of the input letter sequence s; the algorithm is, however, computation-intensive and requires much memory space. In the following there will be explained how the computation time and the need for memory space can be reduced. In the accordingly modified A* algorithm only the open tree nodes are stored, that is, the tree nodes that had already been evaluated but not yet expanded. After the expansion of a tree node the node is erased from the memory. The maximum number of open tree nodes to be stored is predefined a priori. If the number of open tree nodes lies above this predefined maximum number, there can be determined which of these open tree nodes may be discarded for the next computation (so-called pruning), while these nodes must not belong to the optimum tree path, because otherwise the A* algorithm would yield a false result. Thus the problem posed here is to find the tree nodes that are most probably not part of the optimum tree path. To solve this problem, a simple heuristic formation is chosen. The open tree nodes that lie closest to the tree root are then preferably chosen to be left out of consideration. This means that search paths, which already at the beginning have a small probability, are those tree paths that are preferably rated as paths that cannot be used any further.

The described pruning strategy may be implemented efficiently, especially because the open nodes are not stored in a common heap, but a heap is provided for each path length of a heap and the open nodes are stored in the respectively associated heap. If the permissible number of open nodes are exceeded (compare above), in this form of implementation the heap representing the shortest tree path is erased. The period of time necessary for this is substantially constant.

FIG. 4 shows a block diagram of a speech recognition system 1 for recognizing spelled utterances s that have been input, which system works in accordance with the above embodiments for letter speech recognition according to the invention. A block 2 features a speech recognition unit which, based on acoustic models—as is known, HMM (Hidden Markov Models) are used—produces a recognition result r (sequence of letters), while a letter grammar, which denotes the probabilities of the occurrence of different possible letter combinations, is not used by the speech recognition unit 2. The recognition result r is applied to a post-processing unit 3 which, based on statistical models for letter sequences $P_S(\underline{s})$ represented by block 4 and statistical models $P_R(r|\underline{s})$ represented in a block 5 maximizes the respective function $f(\underline{s})$ for the speech recognizer as described above (block 6) and derives therefrom a recognition result $R_S$ to be output. The recognition result $R_S$ is either an estimate of the uttered sequence s or a list N of best estimates of the letter sequence s having the largest probabilities to be the correct estimate.

The block diagram shown in FIG. 5 shows a system with speech control—here preferably a navigation system for motorcars—which includes both a letter speech recognizer 1 as shown in FIG. 4 and a word speech recognizer 7 for recognizing words w that have been input. To implement the invention, however, all speech-controlled systems with function units for recognizing spelled speech utterances are eligible in principle. The recognition result $R_S$ produced by the letter speech recognizer 1 is used for limiting the vocabulary of the word speech recognizer 7, that is, for limiting the words that may be possible as word speech recognition result $R_W$, which leads to a more robust word speech recognition. With a certain initial letter sequence, or N best initial letter sequences as a recognition result $R_S$, the vocabulary of the word speech recognizer 7 is limited to the words that have these initial letter sequences. The recognition result $R_W$ is used for the system control, while the controlled system function units are combined by a block 8. In navigation systems the recognition result represents, for example, a place name whose input causes the navigation system to determine a route leading there.

Now the speech recognition block 2 and the message post-processing unit 3 are transformed by means of different hardware components—the speech recognition block by means of a digital signal processor adapted to speech recognition tasks and the post-processing unit 3 by means of a controller also used for performing other system functions combined by block 8. This is advantageous in that the signal processor may have a smaller computing capacity and a smaller storage capacity because, for recognizing spelled speech utterances that have been input, system resources, which are provided for navigation procedures anyway, can be used in common.

What is claimed is:

1. A method of recognizing a speech utterance (s) available in spelled form, comprising:
 a first processing stage in which a corresponding letter sequence (r) is estimated by means of a letter speech recognition unit (2) based on hidden Markov Models, said letter speech recognition unit not using a letter grammar which denotes probabilities of the occurrence of different possible letter combinations; and
 a second processing stage (3) in which the estimated result (r) produced by the first processing stage utilizing a statistical letter sequence model (4) and a statistical model (5) for the speech recognition unit (2) is post-processed, wherein a dynamic programming method is used during the post-processing wherein a grid structure on which the dynamic programming is based and whose node points are provided for the assignment to accumulated probability values, is converted into a tree structure and an A* algorithm is used for finding an optimum tree path.

2. The method as claimed in claim 1, wherein sub-optimum tree paths corresponding to N best estimates are determined for a speech utterance input with N>1.

3. The method as claimed in claim 1, wherein during the search for an optimum tree path those tree paths that at the beginning of the search have a small probability are not searched.

4. The method as claimed in claim 3, wherein the first processing stage is executed by means of a first IC and the second processing stage is executed by means of a second IC.

5. A method of system control by means of speech signals (w,s) comprising the steps of;
 inputting a whole word (w) serving as a control signal and at least part of this word is input in spelled form (s),
 recognizing the whole word (w) that is input using word speech recognition (7) and letter speech recognition (1) for recognizing the spelled part (s), the letter speech recognition comprising:
 a first processing stage in which a corresponding letter sequence (r) is estimated by means of a letter speech recognition unit (2) based on hidden Markov Models, said letter speech recognition unit not using a letter grammar which denotes probabilities of the occurrence of different possible letter combinations; and a second processing stage (3) in which the estimated result (r) produced by the first processing stage utilizing a statistical letter sequence model (4) and a statistical model (5) for the speech recognition unit (2) is post-processed, wherein a dynamic programming method is used during the post-processing, wherein a grid structure on which the dynamic programming is based and whose node points are provided for the assignment to accumulated probability values, is converted into a tree structure and an A* algorithm is used for finding an optimum tree path; and restricting a vocabulary assigned to the word speech recognition (7) to the recognition results of the letter speech recognition (1).

\* \* \* \* \*